US010040128B2

(12) United States Patent
Spors et al.

(10) Patent No.: US 10,040,128 B2
(45) Date of Patent: Aug. 7, 2018

(54) TOOL ARRANGEMENT

(71) Applicant: KOMET GROUP GMBH, Beisgheim (DE)

(72) Inventors: Benno Spors, Besigheim (DE); Hendrik Nitzsche, Steinheim an der Murr (DE); Manuel Mayer, Illingen (DE)

(73) Assignee: KOMET GROUP GMBH, Besigheim (DE)

( * ) Notice: Subject to any disclaimer, the term of this patent is extended or adjusted under 35 U.S.C. 154(b) by 57 days.

(21) Appl. No.: 15/103,067

(22) PCT Filed: Oct. 23, 2014

(86) PCT No.: PCT/EP2014/072694
§ 371 (c)(1),
(2) Date: Jun. 9, 2016

(87) PCT Pub. No.: WO2015/086207
PCT Pub. Date: Jun. 18, 2015

(65) Prior Publication Data
US 2016/0303660 A1   Oct. 20, 2016

(30) Foreign Application Priority Data
Dec. 10, 2013   (DE) .......... 10 2013 225 472

(51) Int. Cl.
*B23B 31/02*   (2006.01)
*B23B 31/00*   (2006.01)
(Continued)

(52) U.S. Cl.
CPC ............ *B23B 31/02* (2013.01); *B23B 31/001* (2013.01); *B23B 31/1077* (2013.01);
(Continued)

(58) Field of Classification Search
CPC ... B23C 5/003; B23Q 11/0032; B23B 27/002; B23B 29/022; B23B 2250/16; B23B 2251/70; Y10T 408/76
See application file for complete search history.

(56) References Cited

U.S. PATENT DOCUMENTS 1,566,553 A    12/1925  Maisch
2,586,157 A *   2/1952  Gasser .................... B23C 5/26
                                                188/268
(Continued)

FOREIGN PATENT DOCUMENTS

DE        44 00 425 A1    7/1995
DE       696 05 071 T2    4/2000
(Continued)

OTHER PUBLICATIONS

English translation of International Preliminary Report on Patentability for PCT/EP2014/072694 (6 pages).
(Continued)

*Primary Examiner* — Daniel Howell
*Assistant Examiner* — Yasir Diab
(74) *Attorney, Agent, or Firm* — Flynn, Thiel, Boutell & Tanis, P.C.

(57) ABSTRACT

A tool arrangement containing a tool holder and a tool having a tool head for processing workpieces and a shaft supporting the tool head, wherein the tool holder and the shaft each have a planar surface oriented transversely with respect to the axial direction of the tool holder and the shaft, the planar surfaces lying opposite one another. The tool holder and the shaft are connected non-rotatably and releasably to one another by a connecting mechanism which has a journal projecting in the axial direction and a receptacle which receives the journal.

20 Claims, 4 Drawing Sheets

(51) Int. Cl.
  *B23B 31/107* (2006.01)
  *B23Q 11/00* (2006.01)
  *B23C 5/00* (2006.01)
  *B23B 29/02* (2006.01)
  *B23B 27/00* (2006.01)

(52) U.S. Cl.
  CPC ........... *B23B 27/002* (2013.01); *B23B 29/022* (2013.01); *B23B 2226/33* (2013.01); *B23B 2250/16* (2013.01); *B23B 2251/70* (2013.01); *B23B 2260/008* (2013.01); *B23B 2260/026* (2013.01); *B23C 5/003* (2013.01); *B23Q 11/0032* (2013.01)

(56) References Cited

U.S. PATENT DOCUMENTS

| | | | | |
|---|---|---|---|---|
| 3,031,046 A * | 4/1962 | Hoadley | ................. | B23P 15/04 188/268 |
| 5,413,318 A * | 5/1995 | Andreassen | .......... | B23B 29/022 173/211 |
| 6,612,791 B1 * | 9/2003 | Haimer | ................. | B23B 29/046 279/2.03 |
| 6,779,955 B2 * | 8/2004 | Rivin | .................... | B23B 31/006 188/379 |
| 2005/0163559 A1 * | 7/2005 | Chang | .................... | F16B 7/042 403/109.3 |
| 2009/0155010 A1 * | 6/2009 | Cook | ................... | B23B 31/006 409/232 |
| 2011/0233839 A1 | 9/2011 | Haimer | | |
| 2012/0207560 A1 * | 8/2012 | Sakamaki | ............... | B23B 31/00 409/141 |

FOREIGN PATENT DOCUMENTS

| | | |
|---|---|---|
| DE | 20 2007 015 220 U1 | 2/2008 |
| JP | 63-229205 A | 9/1988 |
| WO | WO 2009/043407 A1 | 4/2009 |

OTHER PUBLICATIONS

International Search Report for PCT/EP2014/072694 (2 pgs).
Search Report for German patent application 10 2013 225 472.5 (5 pgs).

\* cited by examiner

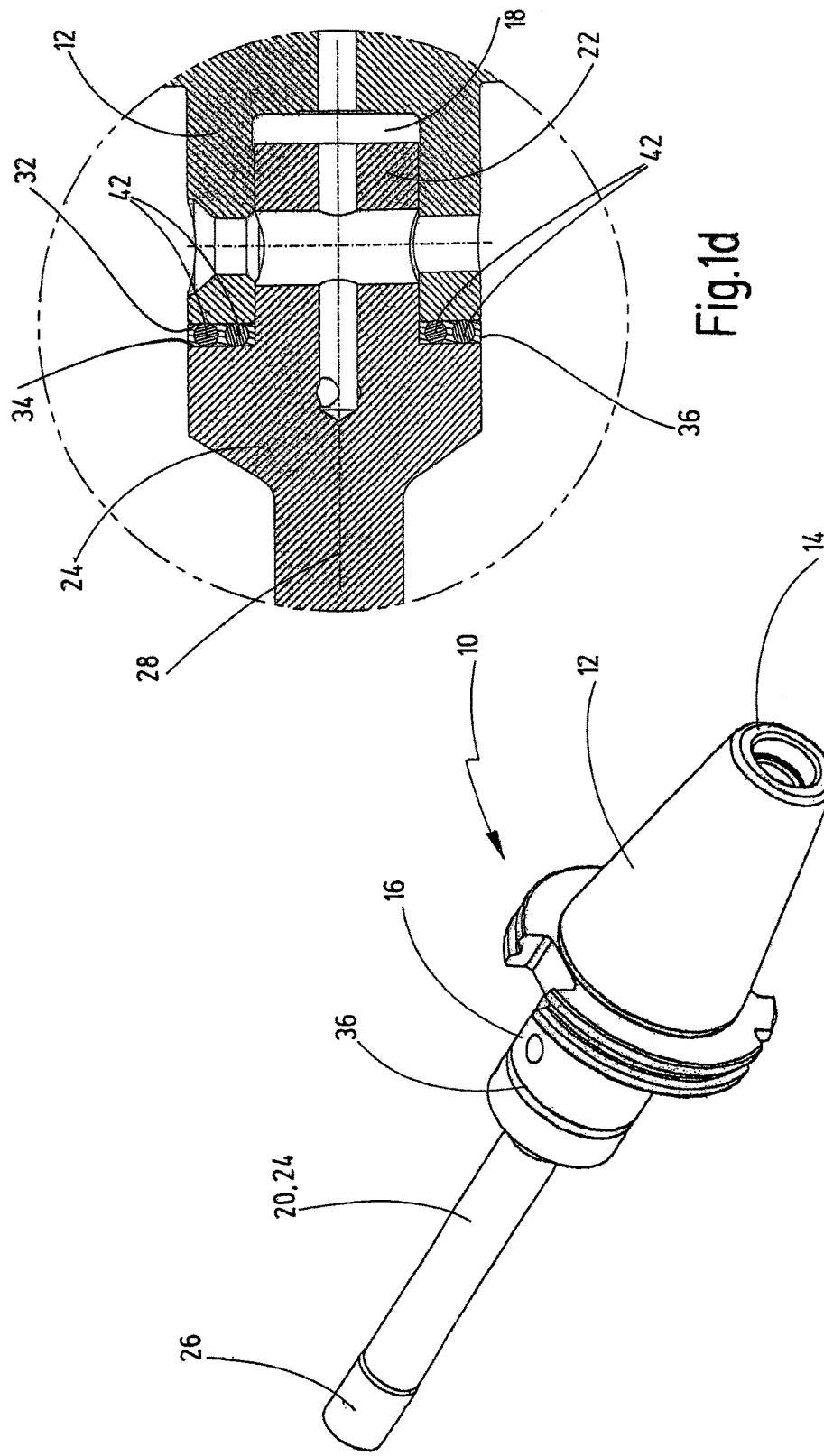

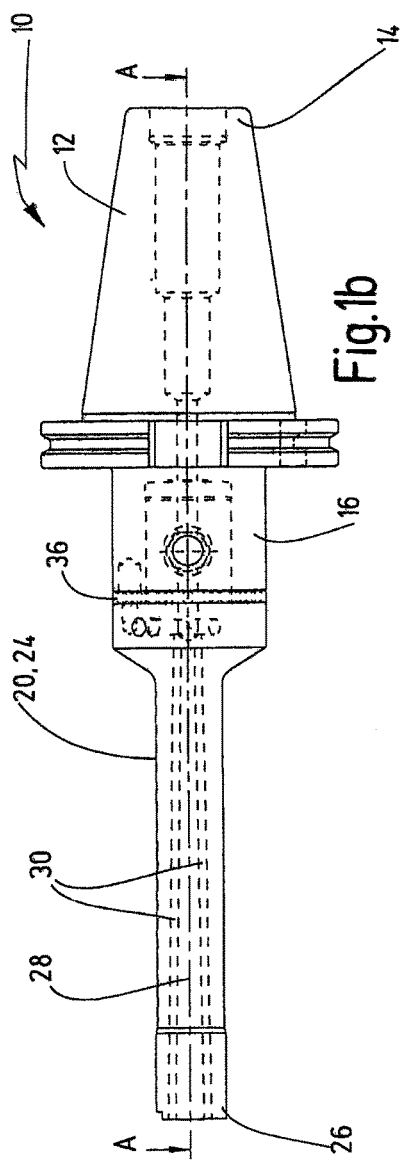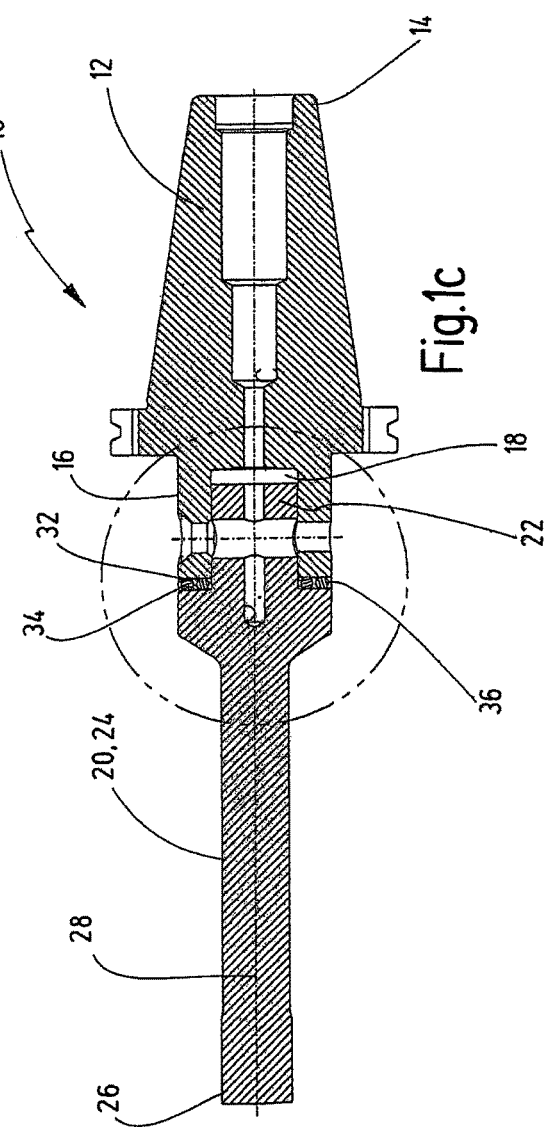

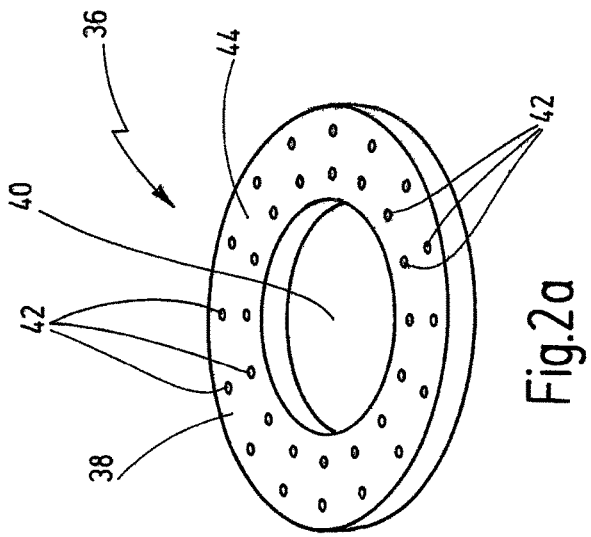
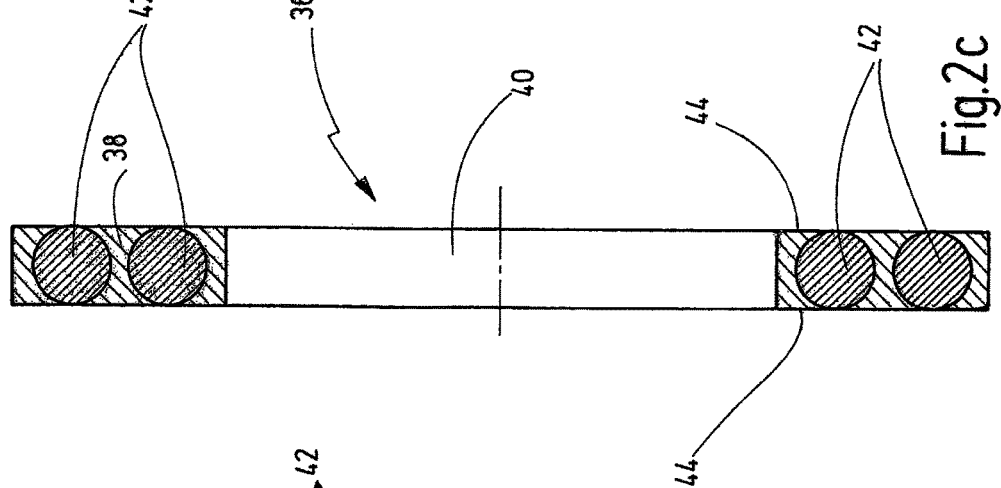
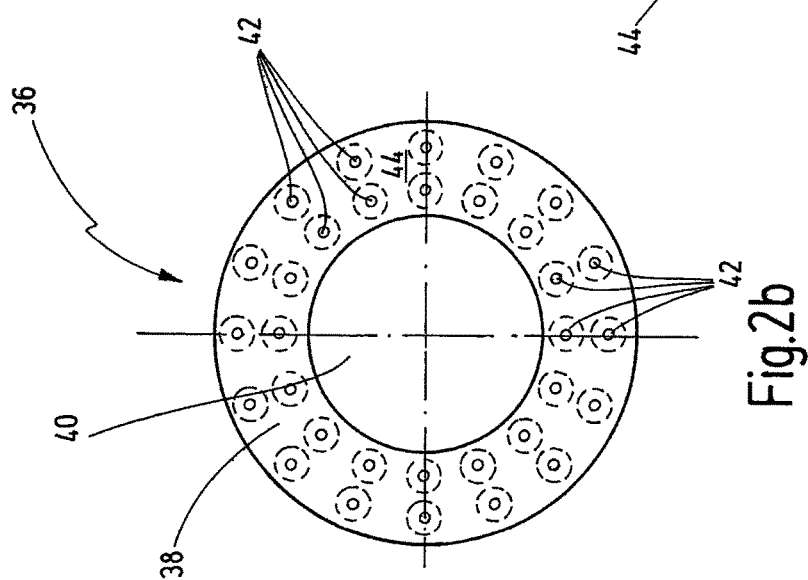

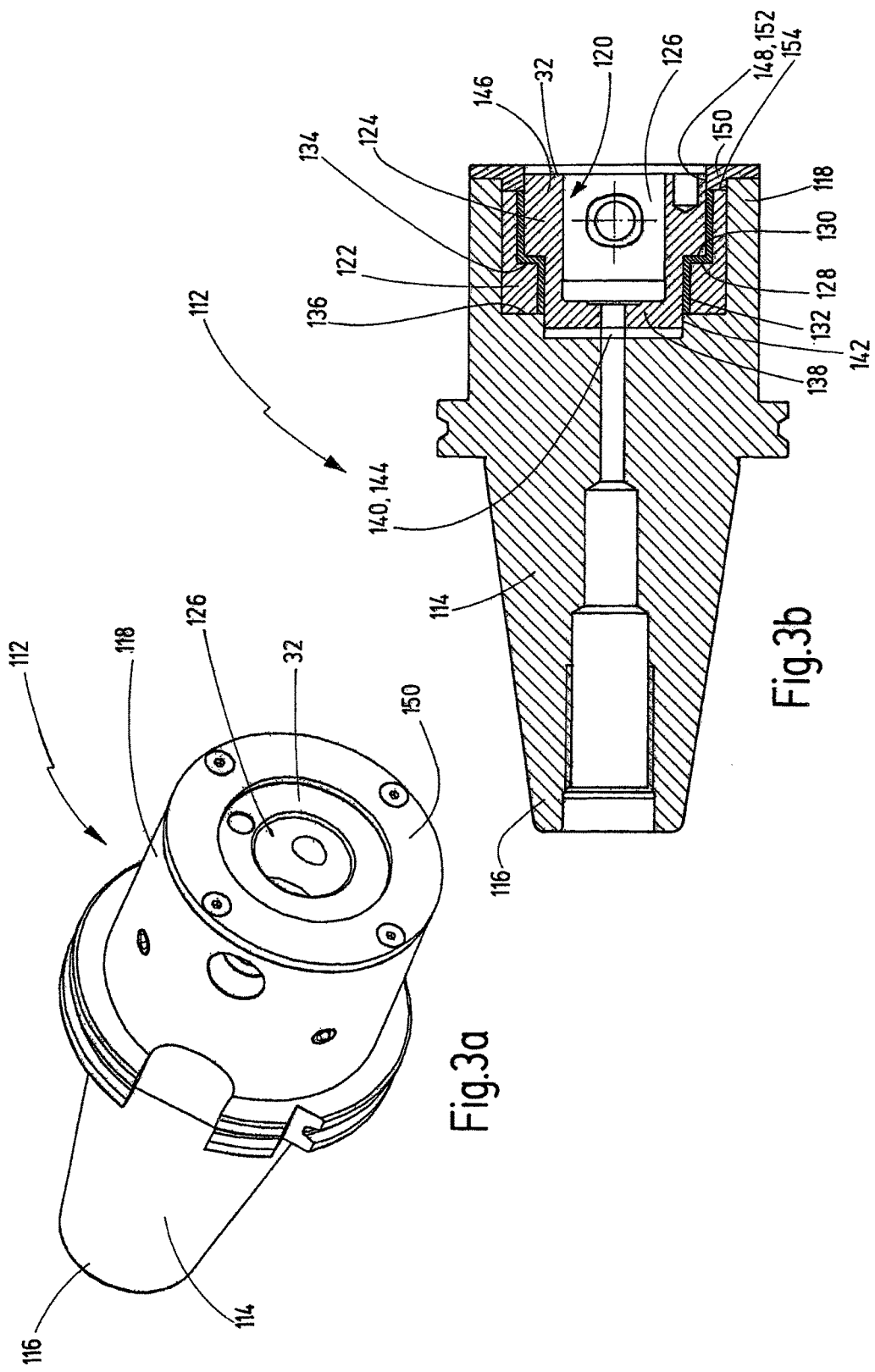

TOOL ARRANGEMENT

FIELD OF THE INVENTION

The invention relates to a tool arrangement and to a sleeve for insertion into a tool holder.

BACKGROUND OF THE INVENTION

Machining tools such as drilling tools which have a tool head which serves to machine workpieces and a shank which supports the tool head are connected fixedly to a tool holder so as to rotate with it, which tool holder is in turn intended to be connected fixedly to a machine spindle so as to rotate with it, with the result that the machine can transmit a rotational movement of the tool. In particular, long machining tools or tool arrangements tend to vibrate during the machining operation. Here, the vibration of the tool arrangement which is assembled from the tool and the tool holder usually takes place in frequency ranges which are unpleasant for the human ear.

OBJECT OF THE INVENTION

It is therefore an object of the invention to develop a tool arrangement and a tool holder of the type mentioned at the outset in such a way that their vibration behavior is improved.

According to the invention, this object is achieved by way of a tool arrangement and a sleeve. Advantageous developments of the invention are the subject matter of the dependent claims, a tool holder which is equipped with a sleeve being used, in particular, in the tool arrangement.

SUMMARY OF THE INVENTION

The invention is based on the concept of decoupling of the individual components of the tool arrangement and/or the tool holder in such a way that they do not vibrate jointly like a single-piece part, but rather that they vibrate in each case individually. As a result of said measure, during workpiece machining, vibrations occur in relatively high frequency ranges, with the result that they are not perceived at all or are perceived as not being unpleasant by the human ear.

According to a first measure according to the invention, it is proposed that means for reducing the friction are arranged between the flat surfaces on the shank of the tool and on the tool holder which lie opposite one another and run at least substantially and as accurately as possibly parallel to one another, which means hold the flat surfaces at a spacing from one another. In order to decouple the tool and the tool holder, the means for reducing the friction have a lower coefficient of friction with respect to at least one flat surface and preferably with respect to each of the flat surfaces, in particular have a lower coefficient of static friction than the flat surfaces when in direct contact with one another. In addition, the compressibility of the means for reducing the friction is not greater than the compressibility of the shank and than the compressibility of the tool holder, with the result that the tool arrangement is not compressed to a greater extent during workpiece machining, in which it is loaded with force in the axial direction, than if the flat surfaces bore directly against one another.

The means for reducing the friction can have an oil film or can consist of an oil film. As a result, the friction between the shank and the tool holder in the region of the flat surfaces is reduced virtually to zero. In addition, an oil film is hardly compressible. It is also possible, however, that the means for reducing the friction have an axial bearing which has rolling bodies, or that a coating which is connected in an integrally joined manner to at least one of the flat surfaces is arranged on said at least one of the flat surfaces, which coating consists of a different material than the shank and/or the tool holder.

According to one preferred refinement, the means for reducing the friction have a spacer element which is arranged loosely between the flat surfaces. Said spacer element can have a friction-reducing coating on at least one of its surfaces which face the flat surfaces. The spacer element preferably has a receiving body, in which rolling bodies are received. The rolling bodies project from at least one of the surfaces of the receiving body which face the flat surfaces and bear against the respective flat surface. Here, the receiving body can be produced from an elastomeric material, since the compressibility of the spacer element is defined by the compressibility of the rolling bodies. The latter can be fixed in the receiving body or else can be embedded rotatably in the rolling body, as a result of which the friction is reduced further.

According to a second measure according to the invention, decoupling already takes place in the tool holder, by the latter having a sleeve with an outer sleeve and an inner sleeve which is received in the outer sleeve and in turn has fastening means for fastening the shank of the tool. The outer sleeve and the inner sleeve are connected fixedly to one another so as to rotate together by way of a circumferentially running damping layer made from elastomeric material, and in each case have a circumferentially running shoulder, the shoulder of the inner sleeve being supported in the axial direction on the shoulder of the outer sleeve. The damping layer has a section which is arranged between the shoulders, holds the latter at a spacing from one another, and extends in the radial direction, with the result that the elastomeric damping layer is arranged at every location between the outer sleeve and the inner sleeve. The damping layer damps vibrations which occur in the inner sleeve and/or the outer sleeve and reduces or prevents a transfer of the vibrations to the respectively other component.

It is preferred that the damping layer is connected in each case in an integrally joined manner to the outer sleeve and to the inner sleeve. Said integrally joined connection is advantageously the only connection of the outer sleeve to the inner sleeve, with the result that there is at least largely complete decoupling.

In addition, the tool holder expediently has a main body which has means at a first end for inserting fixedly into the machine spindle so as to rotate with it and in which the outer sleeve is received fixedly so as to rotate with it at its second end which lies opposite the first end. The outer sleeve can be connected integrally to the main body or else can be received releasably in the main body. It is expediently supported in the axial direction on a bearing face in the main body, whereas the inner sleeve is supported in the axial direction exclusively by way of its shoulder on the shoulder of the outer sleeve. Since the elastomeric damping layer is situated between both shoulders, there is satisfactory decoupling here, whereas vibrations can be transmitted from the outer sleeve via the bearing face to the main body.

Expediently, the inner sleeve preferably protrudes on both sides out of the outer sleeve in the axial direction and is guided in the radial direction in the main body by way of its part which protrudes out of the outer sleeve or by way of its parts which protrude out of the outer sleeve. Said guidance can be realized by means of a plain bearing, an anti-friction bearing or a ball bearing.

The tool holder with an elastomeric damping layer which is arranged between the outer sleeve and the inner sleeve is advantageously used in the tool arrangement which is described at the outset.

BRIEF DESCRIPTION OF THE DRAWINGS

In the following text, the invention will be explained in greater detail using two exemplary embodiments which are shown diagrammatically in the drawing, in which:

FIGS. 1a, 1b, 1c, 1d show a tool arrangement with a tool holder and a tool shank in a perspective view, in a side view and in longitudinal section along the line A-A, and a detailed illustration of the longitudinal section, FIGS. 2a, 2b, 2c show a spacer element in a perspective illustration, in a plan view, and enlarged in section along the line A-A, and FIGS. 3a, 3b show a tool holder in a perspective illustration and in longitudinal section.

DETAILED DESCRIPTION

The tool arrangement 10 which is shown in FIGS. 1a to d has a tool holder 12 which is intended to be connected fixedly to a machine spindle so as to rotate with it by way of a truncated cone which extends from its one end 14, and which has a receptacle 18 as fastening means for a tool 20 at its other end 16. Of the tool 20, the drawing shows only the shank 24 which has a journal 22 which engages into the receptacle 18 and has means for fastening a tool head fixedly so as to rotate with it at the end 26 which faces away from the journal 22. The tool arrangement 10 rotates about its longitudinal center axis 28 during the machining of workpieces. In FIG. 1b, diverging coolant ducts 30 which extend through the shank 24 in the axial direction are indicated using dashed lines.

In the region of the receptacle 18 and the journal 22, the tool holder 12 and the shank 24 in each case have a circularly annular flat surface 32, 34 which extends perpendicularly with respect to the longitudinal center axis 28, the flat surface 32 of the tool holder 12 lying opposite the flat surface 34 of the shank 24 at a spacing. A spacer element 36 is arranged between the flat surfaces 32, 34 (cf. FIGS. 2a to c), which spacer element 36 has an annular receiving body 38 which is made from elastomeric material and through the central recess 40 of which the journal 22 is guided. Spherical rolling bodies 42 are embedded into the receiving body 38, which rolling bodies 42 protrude a little on both sides from the surfaces 44 of the receiving body 38 which face away from one another, and bear against the flat surfaces 32, 34. Here, the rolling bodies 42 are produced from a material, the compressibility of which is not greater than the compressibility of the material, from which the tool holder 12 is produced, and than the compressibility of the material, from which the shank 24 is produced. In comparison with a tool arrangement, in which the flat surfaces 32, 34 bear directly against one another, the friction between the tool holder 12 and the shank 24 in the region of the flat surfaces 32, 34 is reduced considerably. This is significant, in particular, since high forces act on the flat surfaces 32, 34 in the axial direction during clamping of the shank 24 into the tool holder 12 and during pressing of the tool 20 onto a workpiece, with the result that the tool 20 and the tool holder 12 can vibrate like a single-piece component in the case of a high coefficient of friction between the flat surfaces 32, 34. The spacer element 36 reduces the frictional forces which occur in the region of the flat surfaces 32, 34, by its coefficient of friction being lower in relation to each of the flat surfaces 32, 34 than the coefficient of friction of the flat surfaces 32, 34 when in direct contact with one another, with the result that the tool holder 12 and the tool 20 are virtually decoupled with regard to vibrations of the tool arrangement 10.

FIGS. 3a, 3b show a tool holder 112 according to a second exemplary embodiment which can also be used in the tool arrangement 10 instead of the tool holder 12 which is shown there. The tool holder 112 has a main body 114 which has a truncated cone which extends from its first end 116 (shown on the left in FIG. 3b) for fixed insertion into a machine spindle so as to rotate with it. At its second end 118 (shown on the right in FIG. 3b), a sleeve 120 is inserted into the main body 114, which sleeve 120 has an outer sleeve 122 and an inner sleeve 124 which is received in the outer sleeve 122. The inner sleeve 124 has a receptacle 126 as fastening means for a journal of a tool shank, for example for the journal 22 (shown in FIGS. 1c, d) of the shank 24. The outer sleeve 122 and the inner sleeve 124 in each case have a circumferentially running shoulder 128, 130 which extends perpendicularly with respect to a longitudinal center axis of the tool holder 112, the shoulders 128, 130 being supported on one another in the axial direction. A damping layer 132 is arranged between the outer sleeve 122 and the inner sleeve 124, which damping layer 132 is connected in an integrally joined manner both to the outer sleeve 122 and to the inner sleeve 124. A section 134 of the damping layer 132 extends between the shoulders 128, 130, with the result that the integrally joined connection by means of the damping layer 132 is the only connection between the outer sleeve 122 and the inner sleeve 124. On the end side, the outer sleeve 122 is supported on a circularly annular bearing face 136 in the main body 114.

The inner sleeve 124 protrudes on both sides from the outer sleeve 122 in the axial direction. A first part 138 which protrudes out of the outer sleeve 122 protrudes into a central recess 140 in the main body 114, which central recess 140 is bordered by the bearing face 136, and bears there against the main body 114 in the radial direction with the formation of a first plain bearing 142. A gap 144 remains in the axial direction between the inner sleeve 124 and the main body 114, with the result that the inner sleeve 124 is supported only via its shoulder 130 and the section 134 of the damping layer 132 on the outer sleeve 122, but is not supported directly on the main body 114. It is also possible, however, that the gap 144 is filled by means of a disk, on which the inner sleeve 124 is supported. Said disk is then preferably connected fixedly neither to the inner sleeve 124 nor to the main body 114, with the result that it is rotatable with respect to both parts and therefore contributes to decoupling them. A second part 146 of the inner sleeve 124 protrudes out of the outer sleeve 122 on the opposite side and forms a second plain bearing 152 with an inner face 148 of a closing ring 150 which is fixed on the main body 114. In addition, the closing ring 150 bears against an end side 154 of the outer sleeve 122 and fixes the latter in the main body 114.

In summary, the following is to be noted: the invention relates to a tool arrangement 10 having a tool holder 12, 112 and a tool 20 which has a tool head for machining workpieces and a shank 24 which supports the tool head, the tool holder 12, 112 and the shank 24 in each case having a flat surface 32, 34 which is oriented transversely with respect to their axial direction, the flat surfaces 32, 34 lying opposite one another, and the tool holder 12, 112 and the shank 24 being connected releasably and fixedly to one another so as to rotate together by way of connecting means 18, 22, 126 which have a journal 22 which projects in the axial direction and a receptacle 18, 126 which receives the journal 22. It is provided according to the invention that means 36 for reducing the friction are arranged between the flat surfaces 32, 34, which means 36 hold the flat surfaces 32, 34 at a spacing from one another, have a lower coefficient of friction than the flat surfaces 32, 34 when in direct contact with one another in comparison with at least one of the flat surfaces 32, 34, and the compressibility of which means 36 is not greater than the compressibility of the shank 24 and than the compressibility of the tool holder 12, 112.

LIST OF DESIGNATIONS

10 Tool arrangement
12, 112 Tool holder
14, 16, 116, 118 Ends of the tool holder
18, 126 Receptacle
20 Tool
22 Journal
24 Shank
26 End of the shank
28 Longitudinal center axis
30 Coolant duct
32, 34 Flat surfaces
36 Spacer element
38 Receiving body
40 Central recess in the spacer element
42 Rolling bodies
44 Surface
114 Main body
120 Sleeve
122 Outer sleeve
124 Inner sleeve
128, 130 Shoulders
132 Damping layer
134 Section
136 Bearing face
138, 146 Parts of the inner sleeve
140 Central recess in the main body
142, 152 Plain bearing
144 Gap
148 Inner face
150 Closing ring
154 End side

The invention claimed is:

1. A tool arrangement having a longitudinal center axis and a tool holder which can be connected to a machine spindle for rotation around the longitudinal center axis, the tool arrangement comprising:
    a tool head and a shank which supports the tool head having a tool connected thereto for machining a workpiece,
    the tool holder and the shank in each case having a flat surface which is oriented transversely with respect to their axial direction, the flat surfaces lying opposite to one another, and the tool holder and the shank being connected releasably and fixedly to one another so as to rotate together by way of connecting means which have a journal which projects in the axial direction and a receptacle which receives the journal, and
    a device for isolating torsional vibrations in the tool holder and in the shank which supports the tool head around the longitudinal center axis,
    characterized in that
    the device for isolating torsional vibrations has means for reducing friction that are arranged between the flat surfaces, the means for reducing friction hold the flat surfaces at a spacing from one another, have a lower coefficient of friction than the flat surfaces when in direct contact with one another in comparison with at least one of the flat surfaces, and the compressibility of the means for reducing friction is not greater than the compressibility of the shank and the compressibility of the tool holder.

2. The tool arrangement as claimed in claim 1, characterized in that the means for reducing friction have an oil film.

3. The tool arrangement as claimed in claim 1, characterized in that the means for reducing friction have a coating on at least one of the flat surfaces, the coating consisting of a different material than the shank and/or the tool holder and is connected in an integrally joined manner to the respective flat surface.

4. The tool arrangement as claimed in claim 1, characterized in that the means for reducing friction have an axial bearing which has rolling bodies.

5. The tool arrangement as claimed in claim 1, characterized in that the means for reducing friction have a spacer element which is arranged loosely between the flat surfaces.

6. The tool arrangement as claimed in claim 5, characterized in that the spacer element has a friction-reducing coating on at least one of its surfaces which face the flat surfaces.

7. The tool arrangement as claimed in claim 5, characterized in that the spacer element has a receiving body and rolling bodies projecting from at least one of the surfaces of the receiving body which face the flat surfaces and bearing against a relevant flat surface or against the flat surfaces.

8. The tool arrangement as claimed in claim 7, characterized in that the receiving body is produced from an elastomeric material.

9. The tool arrangement as claimed in claim 7, characterized in that the rolling bodies are embedded rotatably in the receiving body.

10. The tool arrangement as claimed in claim 7, characterized in that the rolling bodies are fixed in the receiving body.

11. A method for decoupling torsional vibrations of a tool holder and a shank having a tool which can occur during the machining of a workpiece,
    the tool holder and the shank in each case having a flat surface which is oriented transversely with respect to their axial direction, the flat surfaces lying opposite to one another, and the tool holder and the shank being connected to one another releasably and fixedly so as to rotate together by way of connecting means which have a pin which projects in the axial direction and a receptacle which receives the pin, the method comprising a step of:
    providing means for reducing friction which hold the flat surfaces at a spacing from one another, have a lower coefficient of friction with respect to at least one of the flat surfaces than when the flat surfaces are in direct contact with one another, and a compressibility of which is not greater than the compressibility of the shank and the compressibility of the tool holder.

12. The method as claimed in claim 11, characterized in that the means for reducing friction have an oil film.

13. The method as claimed in claim 11, characterized in that the means for reducing friction have a coating on at least one of the flat surfaces which consists of a different material than the shank and/or the tool holder and is connected in an integrally joined manner to the respective flat surface.

14. The method as claimed in claim 11, characterized in that the means for reducing friction have an axial bearing which has rolling bodies.

15. The method as claimed in claim 11, characterized in that the means for reducing friction have a spacer element which is arranged loosely between the flat surfaces.

16. The method as claimed in claim 15, characterized in that the spacer element has a friction-reducing coating on at least one of its surfaces which face the flat surfaces.

17. The method as claimed in claim 15, characterized in that the spacer element has a receiving body, rolling bodies projecting from at least one of the surfaces of the receiving body which face the flat surfaces and bearing against a relevant flat surface or against the flat surfaces.

18. The method as claimed in claim 17, characterized in that the receiving body is produced from an elastomeric material.

19. The method as claimed in claim 17, characterized in that the rolling bodies are embedded rotatably in the receiving body.

20. The method as claimed in claim 17, characterized in that the rolling bodies are fixed in the receiving body.

* * * * *